(12) United States Patent
Hiura et al.

(10) Patent No.: US 11,687,743 B2
(45) Date of Patent: Jun. 27, 2023

(54) INFORMATION PROCESSING APPARATUS AND PORTABLE TERMINAL AS WELL AS INFORMATION PROCESSING METHOD

(71) Applicant: SONY GROUP CORPORATION, Tokyo (JP)

(72) Inventors: Yuji Hiura, Kanagawa (JP); Masahiro Sueyoshi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 165 days.

(21) Appl. No.: 17/422,361

(22) PCT Filed: Dec. 6, 2019

(86) PCT No.: PCT/JP2019/047830
§ 371 (c)(1),
(2) Date: Jul. 12, 2021

(87) PCT Pub. No.: WO2020/174802
PCT Pub. Date: Sep. 3, 2020

(65) Prior Publication Data
US 2022/0075967 A1    Mar. 10, 2022

(30) Foreign Application Priority Data

Feb. 25, 2019    (JP) .................................. 2019-031365

(51) Int. Cl.
*G06K 7/10*    (2006.01)
*H04B 5/00*    (2006.01)

(52) U.S. Cl.
CPC ....... *G06K 7/10297* (2013.01); *H04B 5/0056* (2013.01)

(58) Field of Classification Search
CPC .......................... G06K 7/10297; H04B 5/0056
(Continued)

(56) References Cited

U.S. PATENT DOCUMENTS 11,257,072 B1 * 2/2022 Aument ............. G06Q 20/3224
11,562,358 B2 * 1/2023 Rule ..................... G06Q 20/352
(Continued)

FOREIGN PATENT DOCUMENTS

EP          3402156 A1    11/2018
JP       2010-170174 A     8/2010
(Continued)

*Primary Examiner* — Ahshik Kim
(74) *Attorney, Agent, or Firm* — Paratus Law Group, PLLC

(57) ABSTRACT

A portable terminal issues an authentication process request for an information storage medium to an information processing apparatus by using terminal information indicative of an information terminal, which performs authentication of the information storage medium without performing short-range wireless communication with the information storage medium. The information processing apparatus has the portable terminal output an authentication information request to the information storage medium by short-range wireless communication, performs authentication of the information storage medium on the basis of an authentication information answer, and outputs, to the portable terminal, approval information to be used when the information terminal is to acquire a result of authentication of the information storage medium from the information processing apparatus. The portable terminal performs display based on the approval information. The information terminal can acquire an authentication result relating to a user of the information storage medium from the information processing apparatus, by using the displayed permission information. Accordingly, authentication of an information storage medium for which reading out and writing of information can be performed by proximity wireless communication can be performed by an information terminal that does not have a proximity wireless communication function.

18 Claims, 11 Drawing Sheets

(58) Field of Classification Search
USPC .......................................................... 235/451
See application file for complete search history.

(56)  References Cited

U.S. PATENT DOCUMENTS

| | | | |
|---|---|---|---|
| 2013/0145420 A1 | 6/2013 | Ting et al. | |
| 2017/0026357 A1 | 1/2017 | Okabayashi | |
| 2020/0286069 A1* | 9/2020 | Pearson | .............. H04W 12/009 |
| 2022/0164899 A1* | 5/2022 | Brown | ............. G06K 19/06112 |
| 2022/0172202 A1* | 6/2022 | Wedmore | ................. G07F 17/12 |
| 2022/0277306 A1* | 9/2022 | Levitt | ................. G06Q 20/4014 |

FOREIGN PATENT DOCUMENTS

| | | |
|---|---|---|
| JP | 2010-287250 A | 12/2010 |
| JP | 2016-534459 A | 11/2016 |

\* cited by examiner

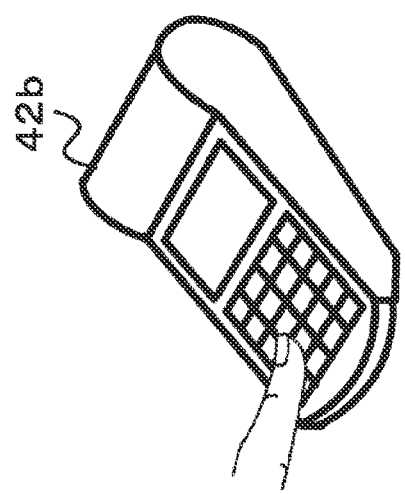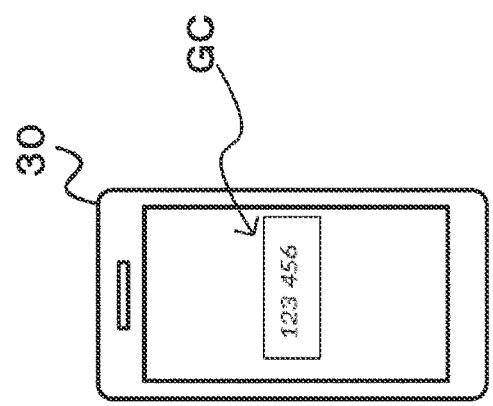
FIG. 9

INFORMATION PROCESSING APPARATUS AND PORTABLE TERMINAL AS WELL AS INFORMATION PROCESSING METHOD

CROSS REFERENCE TO PRIOR APPLICATION

This application is a National Stage Patent Application of PCT International Patent Application No. PCT/JP2019/047830 (filed on Dec. 6, 2019) under 35 U.S.C. § 371, which claims priority to Japanese Patent Application No. 2019-031365 (filed on Feb. 25, 2019), which are all hereby incorporated by reference in their entirety.

TECHNICAL FIELD

The present technology relates to an information processing apparatus and a portable terminal as well as an information processing method.

BACKGROUND ART

For a contactless IC card, a reading out process or a writing process is performed by proximity wireless communication (NFC: Near Field Communication). For example, in PTL 1, the type of a contactless IC card is determined on the basis of with which of the information, among the pieces of information of plural types of contactless IC cards retained in a reader-writer, the information transmitted from the contactless IC card by proximity wireless communication corresponds, to perform a reading out process or a writing process.

CITATION LIST

Patent Literature

[PTL 1]
Japanese Patent Laid-Open No. 2010-170174

SUMMARY

Technical Problem

Incidentally, in an information terminal that is used for authentication of a user or the like, a scanner for reading a barcode and a PIN pad for inputting a password are widely used. However, in a case where an information terminal that does not have a short-range wireless communication function (for example, NFC) is used, authentication of a contactless IC card cannot be performed.

Therefore, it is an object of the present technology to provide an information processing apparatus and a portable terminal as well as an information processing method that can perform authentication of an information storage medium for which reading out and writing of information can be performed by short-range wireless communication, by using a specific information terminal that does not have a short-range wireless communication function.

Solution to Problem

The first aspect of the present technology resides in a portable terminal including an information acquisition unit that issues, using terminal information indicative of an information terminal that performs authentication of an information storage medium without performing short-range wireless communication with the information storage medium, an authentication process request for the information storage medium to an information processing apparatus and acquires, from the information processing apparatus, approval information that is to be used when a result of authentication of the information storage medium is to be acquired from the information processing apparatus by the information terminal, and a display unit that performs display based on the approval information acquired by the information acquisition unit.

In the present technology, the terminal information indicative of the information terminal that performs authentication of an information storage medium without performing short-range wireless communication with the information storage medium is stored, for example, in a wireless tag that is a terminal information presentation unit. Further, the terminal information may be provided in association with position information of the information terminal or may be included in application software. The information acquisition unit of the portable terminal acquires the terminal information through short-range wireless communication with the wireless tag, a current position detected by a position detection unit that detects a current position, or operation of application software. Then, the information acquisition unit uses the acquired terminal information to issue an authentication process request for the information storage medium to the information processing apparatus, and acquires, from the information processing apparatus, approval information to be used when a result of authentication of the information storage medium is to be acquired from the information processing apparatus by the information terminal. The information acquisition unit of the portable terminal makes it possible for the information processing apparatus to perform authentication of the information storage medium, by performing short-range wireless communication with the information storage medium, outputting, to the information storage medium, an authentication information request supplied from the information processing apparatus in response to the authentication process request, and then outputting, to the information processing apparatus, an authentication information answer from the information recording medium corresponding to the authentication information request.

The display unit of the portable terminal performs rendering of the approval information and displays a barcode image. Further, the information acquisition unit acquires an encrypted ID code from the information processing apparatus by using the terminal information and the approval information, and the display unit displays the acquired encrypted ID code. The information acquisition unit acquires an encrypted ID code of a code length indicated by encrypted ID code attribute information included in the terminal information from the information processing apparatus.

The information acquisition unit uses, for example, expiration date information indicated by the encrypted ID code attribute information included in the terminal information, to acquire an encrypted ID code from the information processing apparatus, and acquires again, in a case where an expiration date of the encrypted ID code displayed on the display unit has passed, the encrypted ID code from the information processing apparatus.

The second aspect of the present technology resides in an information processing method including causing an information acquisition unit to issue, using terminal information indicative of an information terminal that performs authentication of an information storage medium without performing short-range wireless communication with the information storage medium, an authentication process request for the information storage medium to an information processing apparatus and to acquire, from the information processing apparatus, approval information that is to be used when a result of authentication of the information storage medium is to be acquired from the information processing apparatus by the information acquisition unit, and causing a display unit to perform display based on the approval information acquired by the information acquisition unit.

The third aspect of the present technology resides in an information processing apparatus including an authentication processing unit that outputs an authentication information request to a portable terminal according to an authentication process request for an information storage medium from the portable terminal, the authentication process request being made with use of terminal information indicative of an information terminal that performs authentication of the information storage medium without performing short-range wireless communication with the information storage medium, performs authentication of the information storage medium on the basis of an authentication information answer supplied from the portable terminal, and outputs approval information that is to be used when a result of authentication of the information storage medium is to be acquired from the information processing apparatus by the information terminal, to the portable terminal.

In the present technology, an information request is outputted from the authentication processing unit to the portable terminal, according to an authentication process request for an information storage medium from the portable terminal using terminal information indicative of the information terminal that performs authentication of the information storage medium without performing short-range wireless communication with the information storage medium. Further, the authentication processing unit performs authentication of the information storage medium on the basis of an authentication information answer supplied from the portable terminal, and outputs, when the authentication processing unit succeeds in verifying that the authentication information answer is an authentication information answer from an information storage medium registered in advance, on the basis of medium unique information of the information storage medium indicated by the authentication information answer, approval information to be used when a result of authentication of the information storage medium is to be acquired from the information processing apparatus, to the portable terminal. Further, when the authentication processing unit succeeds in verifying that the authentication information answer is an authentication information answer from the information storage medium registered in advance, it registers permission information in association with the terminal information and medium unique information of the information storage medium, into a database.

Further, the authentication processing unit may generate an encrypted ID code according to a request for an encrypted ID code from the portable terminal including the approval information and encrypted ID code attribute information from the portable terminal, and may output the encrypted ID code to the portable terminal, to register the outputted encrypted ID code in association with the terminal information and the permission information, into the database.

Further, the authentication processing unit generates a verification answer on the basis of a result of comparison between the terminal information indicated by an approval information verification request from the information terminal and approval information or between the terminal information indicated by an encrypted ID code verification request from the information terminal and the encrypted ID code and notifies the information terminal of the verification answer.

The fourth aspect of the present technology resides in an information processing method including outputting an authentication information request to a portable terminal, according to an authentication process request for an information storage medium from the portable terminal using terminal information indicative of an information terminal that performs authentication of the information storage medium without performing short-range wireless communication with the information storage medium, performing authentication of the information storage medium on the basis of an authentication information answer supplied from the portable terminal, and outputting approval information that is to be used when a result of authentication of the information storage medium is to be acquired from the information processing apparatus by the information terminal, from an authentication processing unit, to the portable terminal.

BRIEF DESCRIPTION OF DRAWINGS

FIG. 9 is a view depicting acceptance of a code input.

DESCRIPTION OF EMBODIMENT

In the following, a mode for carrying out the present technology is described. It is to be noted that the description is given in the following order.

1. Configuration of Information Processing System
2. Configuration of Information Storage Medium
3. Configuration of Portable Terminal
4. Configuration of Information Terminal
5. Configuration of Information Processing Apparatus
6. Operation of Information Processing System
6-1. First Operation of Information Processing System
6-2. Second Operation of Information Processing System
6-3. Other Operation of Information Processing System <1. Configuration of Information Processing System>

Figure 1:
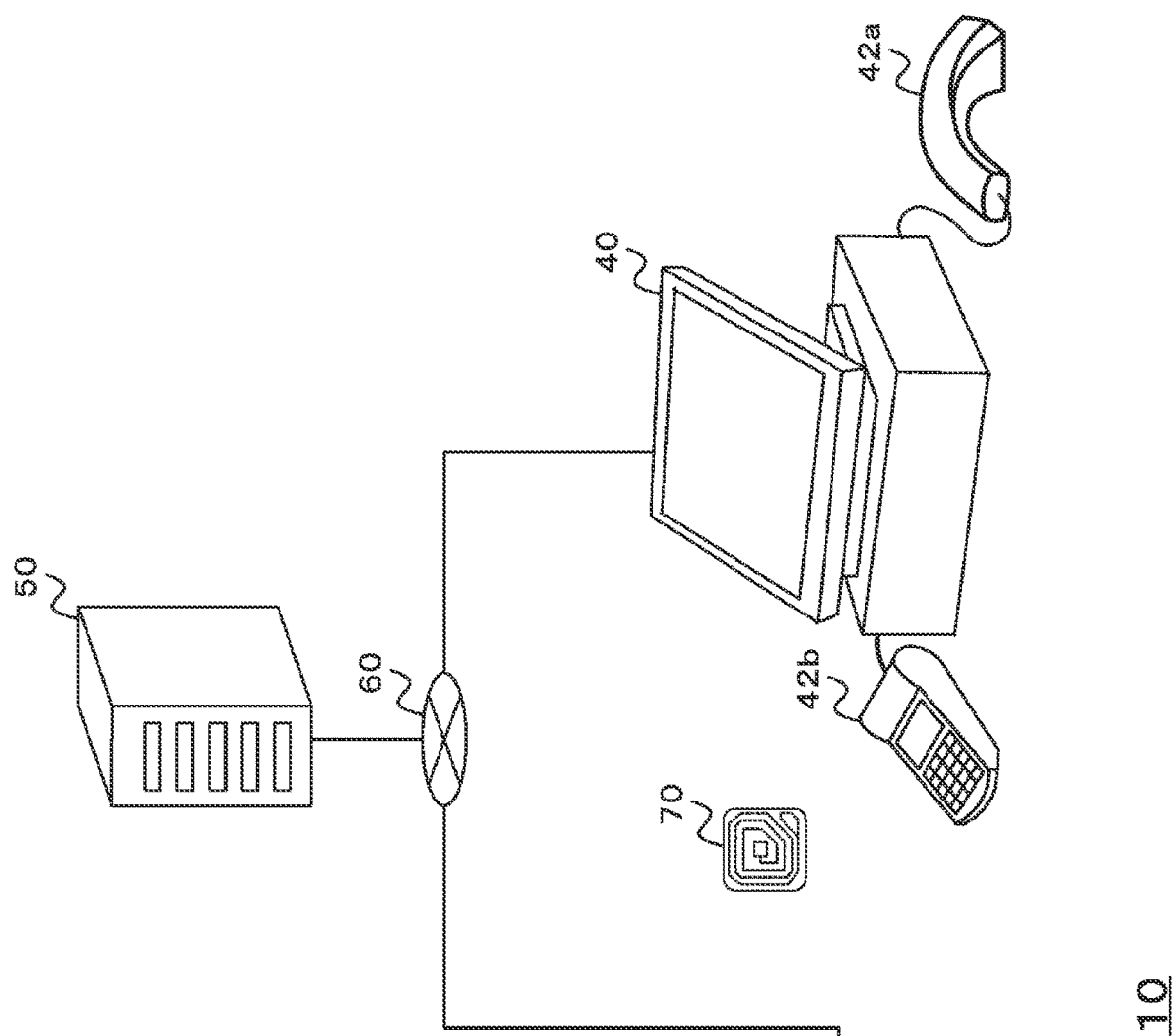
FIG. 1 is a view depicting an example of a configuration of an information processing system.

FIG. 1 depicts an example of a configuration of an information processing system in which a portable terminal and an information processing apparatus of the present disclosure are used. In the example of the configuration depicted in FIG. 1, an information processing system 10 includes an information storage medium (for example, a contactless IC card) 20, a portable terminal (for example, a smartphone) 30, an information terminal 40, and an information processing apparatus (for example, a server) 50. The information storage medium 20 has a short-range wireless communication function (for example, NFC). The portable terminal 30 has a short-range wireless communication function and a function of performing communication with equipment connected to a network 60. The information terminal 40 does not have a short-range wireless communication function but has a function of performing communication with equipment connected to the network 60. Further, the information processing apparatus 50 has a function of performing communication with equipment connected to the network 60. Furthermore, in the information processing system 10, a terminal information presentation unit 70 that allows the portable terminal 30 to acquire terminal information indicative of the information terminal 40 is provided.

The terminal information may indicate not only the information terminal 40 but also a shop, an event venue, a station, or the like in which the information terminal 40 is installed. For example, in a case where plural information terminals 40 are provided in the same shop, the information terminals 40 in the shop may be grouped, and the terminal information may be information indicating any of the groups. Further, the terminal information may indicate a manager or the like of a shop, an event venue, a station, or the like in which the information terminal 40 is installed. For example, in a case where the information terminals 40 are provided in plural affiliated shops, the information terminals 40 in plural affiliated shops may be grouped, and the terminal information may be information indicative of any of the groups. It is to be noted that, in the following description, the terminal information is information indicative of the information terminal 40.

The portable terminal 30 acquires, from the terminal information presentation unit 70, terminal information indicative of an information terminal 40 that performs authentication of the information storage medium 20 without performing short-range wireless communication with the information storage medium. For example, the terminal information presentation unit 70 includes a wireless tag, an application program provided by a manager of the information terminal 40 or by the information processing apparatus 50, or an application program shared by individual information terminals 40, and so forth. The portable terminal 30 performs short-range wireless communication with the wireless tag or executes the application program, to acquire the terminal information.

The portable terminal 30 issues an authentication process request for an information storage medium to the information processing apparatus 50, by using the acquired terminal information, to acquire, from the information processing apparatus 50, approval information that is to be used when a result of authentication of the information storage medium is to be acquired from the information processing apparatus 50 by the information terminal 40, and then performs display based on the acquired approval information.

Further, the portable terminal 30 performs short-range wireless communication with the information storage medium 20 and outputs, to the information storage medium 20, the authentication information request supplied from the information processing apparatus 50 according to the authentication process request, and then acquires an authentication information answer from the information storage medium 20 corresponding to the authentication information request. Further, the portable terminal 30 outputs the acquired authentication information answer to the information processing apparatus 50 such that the information processing apparatus 50 performs authentication of the information storage medium of the authentication target in the information terminal 40. Furthermore, the portable terminal 30 acquires approval information that is to be used when a result of authentication of the information storage medium is to be acquired from the information processing apparatus 50 by the information terminal 40, and performs display based on the approval information.

As the authentication process for the information storage medium 20, the information terminal 40 accepts an input using the display based on the approval information of the portable terminal 30 by a barcode reader 42*a* or a PIN (Personal Identification Number) pad 42*b* thereof and issues an approval information verification request including the inputted permission information and terminal information to the information processing apparatus 50, to acquire a result of verification of the information storage medium 20 from the information processing apparatus 50.

The information processing apparatus 50 outputs the authentication information request to the portable terminal 30 according to the authentication process request for the information storage medium 20 from the portable terminal 30 using the terminal information indicative of the information terminal 40, and performs authentication of the information storage medium 20 on the basis of an authentication information answer supplied from the portable terminal 30. Then, the information processing apparatus 50 outputs approval information that is to be used when a result of authentication of the information storage medium 20 is to be acquired from the information processing apparatus 50 by the information terminal 40, to the portable terminal 30. Further, the authentication processing unit may generate an encrypted ID code in response to a request for an encrypted ID code from the portable terminal including approval information and encrypted ID code attribute information from the portable terminal and may output the encrypted ID code to the portable terminal. It is to be noted that the encrypted ID code is information that is used when the result of authentication of the information storage medium is to be acquired from the information processing apparatus 50 by the information terminal 40 and is a code number that can be recognized by the user. Further, the information processing apparatus 50 performs verification according to a verification request for the approval information or for an encrypted ID code from the information terminal 40, and generates and outputs a verification answer indicative of the verification result to the information terminal 40.

<2. Configuration of Information Storage Medium>

Figure 2:
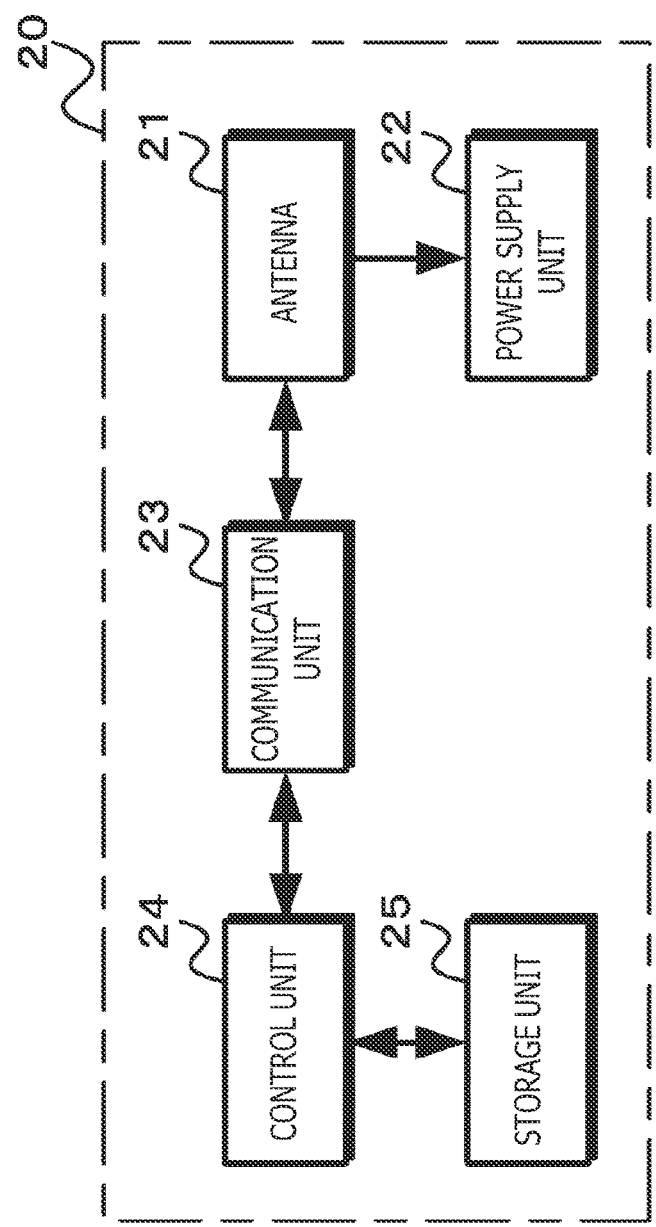
FIG. 2 is a view exemplifying a configuration of an information storage medium (contactless IC card).

FIG. 2 exemplifies a configuration of the information storage medium. It is to be noted that, in the following description, the information storage medium 20 is a contactless IC card.

The information storage medium 20 includes an antenna 21, a power supply unit 22, a communication unit 23, a storage unit 24, and a control unit 25. The antenna 21 is used to establish coupling to the portable terminal 30 by electromagnetic induction and perform transmission of information and so forth and transfer of power, and is connected to the power supply unit 22 and the communication unit 23.

The power supply unit 22 performs conversion of an AC voltage generated in the antenna 21 through the coupling to the portable terminal 30 by the electromagnetic induction into a DC fixed voltage and supplies power to the communication unit 23, the storage unit 24, and the control unit 25.

The communication unit 23 outputs a reception signal obtained by demodulating a wireless signal received by the antenna 21 to the control unit 25. Further, the communication unit 23 modulates a transmission signal supplied from the control unit 25 and transmits the modulated transmission signal as a wireless signal from the antenna 21.

The storage unit 24 stores various kinds of information therein. For example, the storage unit 24 stores therein medium unique information unique to the information storage medium 20, a use situation of the information storage medium 20, information supplied from the information processing apparatus, and so forth.

The control unit 25 performs reading out of information stored in the storage unit 24, writing of information into the storage unit 24, and so forth, according to a command from the portable terminal 30.

<3. Configuration of Portable Terminal>

Figure 3:
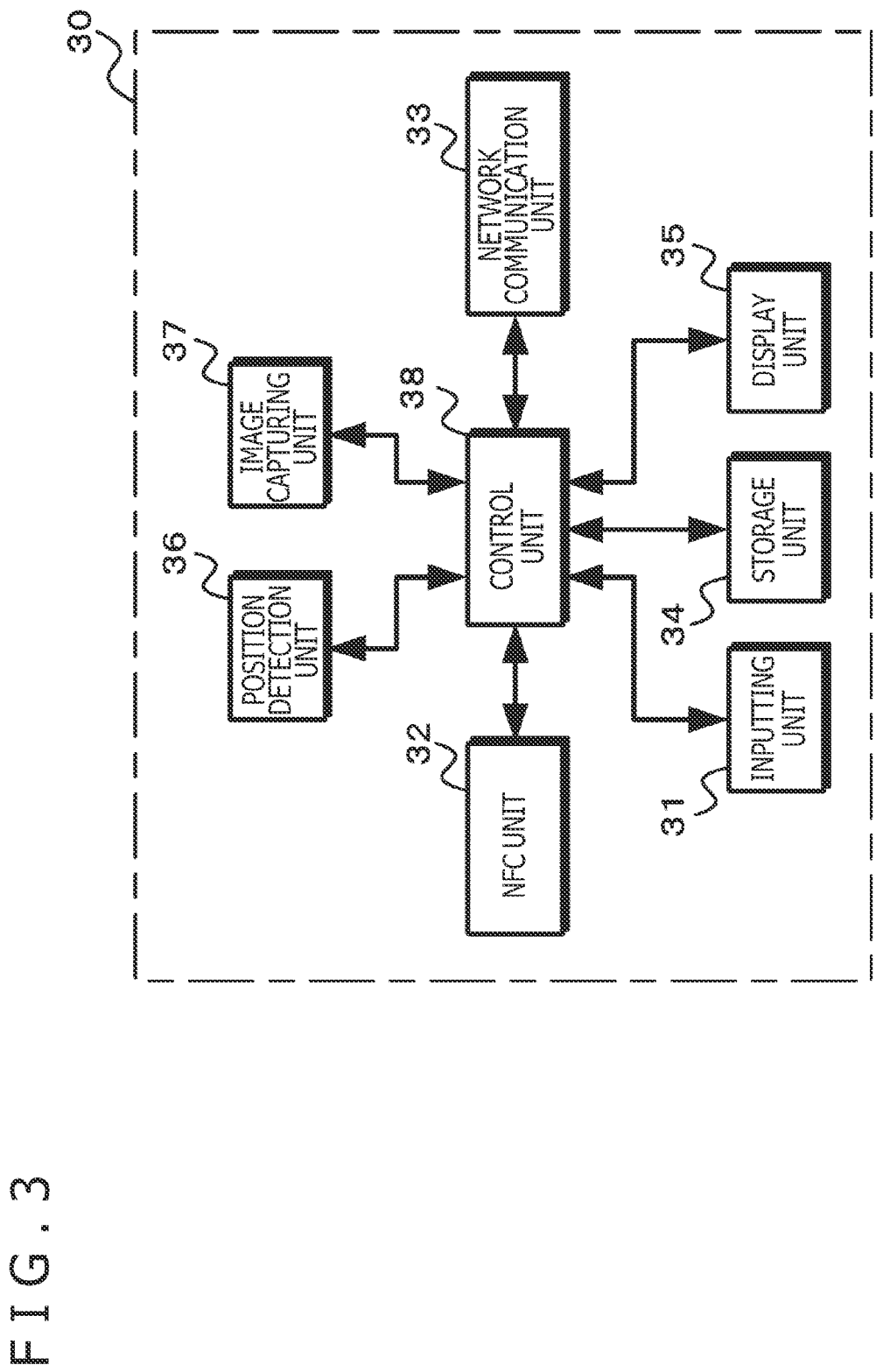
FIG. 3 is a view exemplifying a configuration of a portable terminal.

FIG. 3 exemplifies a configuration of the portable terminal. The portable terminal 30 includes an inputting unit 31, an NFC unit 32, a network communication unit 33, a storage unit 34, a display unit 35, a position detection unit 36, an image capturing unit 37, and a control unit 38.

The inputting unit 31 is configured using a touch panel, switches, inputting keys, and so forth and outputs an operation signal according to a user operation thereof to the control unit 38. For example, on the inputting unit 31, an operation relating to authentication of a contactless IC card, an operation relating to a telephone call, an operation for creation or transmission/reception of an electronic mail, an operation for setting operation of the portable terminal, an operation for changing the operation of the portable terminal, and so forth are performed. The inputting unit 31 may otherwise be configured using a microphone or the like and acquires and outputs, for example, speech for instructing various operations or telephone conversation voice to the control unit 38. Furthermore, the inputting unit 31 may be configured such that it receives a remote control signal for which infrared rays or other radio waves are used and outputs the reception signal to the control unit 38.

The NFC unit 32 performs short-range wireless communication with the information storage medium 20 and performs information transmission to and from the information storage medium 20 and power supply to the information storage medium 20.

The network communication unit 33 performs communication using Bluetooth (registered trademark), communication using Wi-Fi (registered trademark), mobile communication, and so forth.

The storage unit 34 is configured using a semiconductor memory and so forth and stores control programs and application programs to be executed by the control unit 38, data to be used when the programs are executed, data generated by execution of the programs, and so forth.

The display unit 35 is configured using a liquid crystal display element, an organic EL (Electro Luminescence) display element, or the like. The display unit 35 performs display of various menus, display indicating an operation state, a setting state, and so forth, operation display of various applications, display of various kinds of information, and so forth.

The position detection unit 36 is configured using a position measurement signal reception unit, a gyro sensor, an acceleration sensor, and so forth, and detects a current position of the portable terminal on the basis of a position measurement signal and a sensor signal and outputs a result of the detection to the control unit 38.

The image capturing unit 37 is configured using a lens, an image capturing element, and so forth and outputs a captured image signal to the control unit 38.

The control unit 38 is configured using, for example, a CPU (Central Processing Unit) and so forth. The control unit 38 executes the programs stored in the storage unit 34. Further, the control unit 38 controls the associated components on the basis of an operation signal from the inputting unit 31 such that operation according to a user operation is performed by the portable terminal 30. Further, the control unit 38 performs operation as an information acquisition unit that uses terminal information indicative of an information terminal 40, which performs authentication of the information storage medium 20 without performing short-range wireless communication with the information storage medium 20, to perform authentication process request for the information storage medium 20 to the information processing apparatus 50 and acquires, from the information processing apparatus 50, approval information that is to be used when a result of authentication of the information storage medium 20 is acquired from the information processing apparatus 50 by the information terminal 40.

<4. Configuration of Information Terminal>

Figure 4:
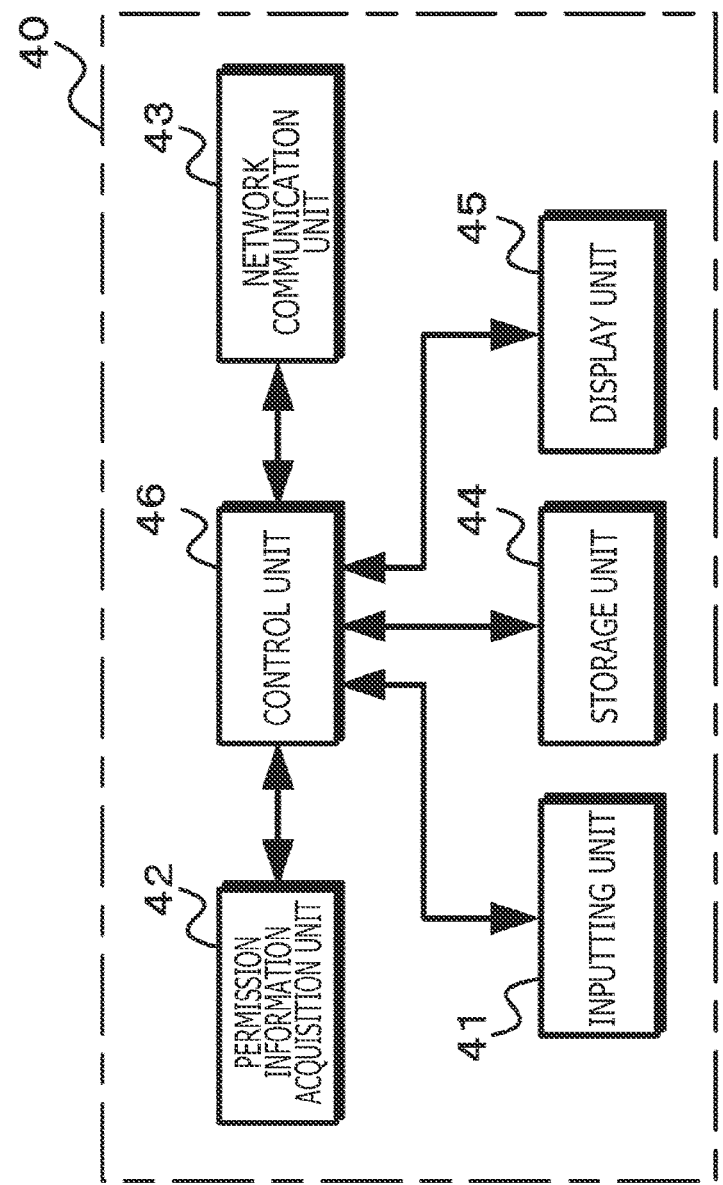
FIG. 4 is a view exemplifying a configuration of an information terminal.

Now, a configuration of the information terminal is described. FIG. 4 exemplifies a configuration of the information terminal. The information terminal 40 includes an inputting unit 41, a permission information acquisition unit 42, a network communication unit 43, a storage unit 44, a display unit 45, and a control unit 46.

The inputting unit 41 is configured using a touch panel, inputting keys, and so forth and outputs an operation signal according to a user operation to the control unit 46. For example, on the inputting unit 41, an operation for setting the operation of the information terminal, an operation for changing the operation of the information terminal, and so forth are performed.

The permission information acquisition unit 42 is configured using at least one of a barcode reader 42a for reading a one-dimensional or two-dimensional barcode and a PIN pad 42b. The permission information acquisition unit 42 reads a barcode displayed on the portable terminal 30 or the like or accepts an input of an encrypted ID code by the PIN pad and outputs approval information indicative of the read code or the inputted code to the control unit 46.

The network communication unit 43 performs communication using Wi-Fi (registered trademark), communication using a wired LAN, or the like to perform communication of information with the information processing apparatus 50.

The storage unit 44 is configured using a semiconductor memory and so forth. The storage unit 44 may otherwise be configured using, for example, a magnetic storage device such as a hard disk drive (HDD: Hard Disk Drive), an optical storage device, a magneto-optical storage device, or the like. The storage unit 44 stores programs to be executed by the control unit 46, pieces of data that are used when the programs are executed, data generated by execution of the programs, and so forth.

The display unit 45 is configured using a liquid crystal display device, an organic EL (Electro Luminescence) display element, or the like. The display unit 45 performs display of an operation state or a setting state of the information terminal 40, an operation setting menu, and so forth.

The control unit 46 is configured using, for example, a CPU (Central Processing Unit) or the like. The control unit 46 executes programs stored in the storage unit 44. Further, the control unit 46 controls the associated components on the basis of an operation signal from the inputting unit 41 such that operation according to the user operation is performed by the information terminal 40. Furthermore, the control unit 46 issues an approval information verification request including inputted permission information and terminal information to the information processing apparatus 50, and acquires a result of authentication of the information storage medium 20 from the information processing apparatus 50.

<5. Configuration of Information Processing Apparatus>

Figure 5:
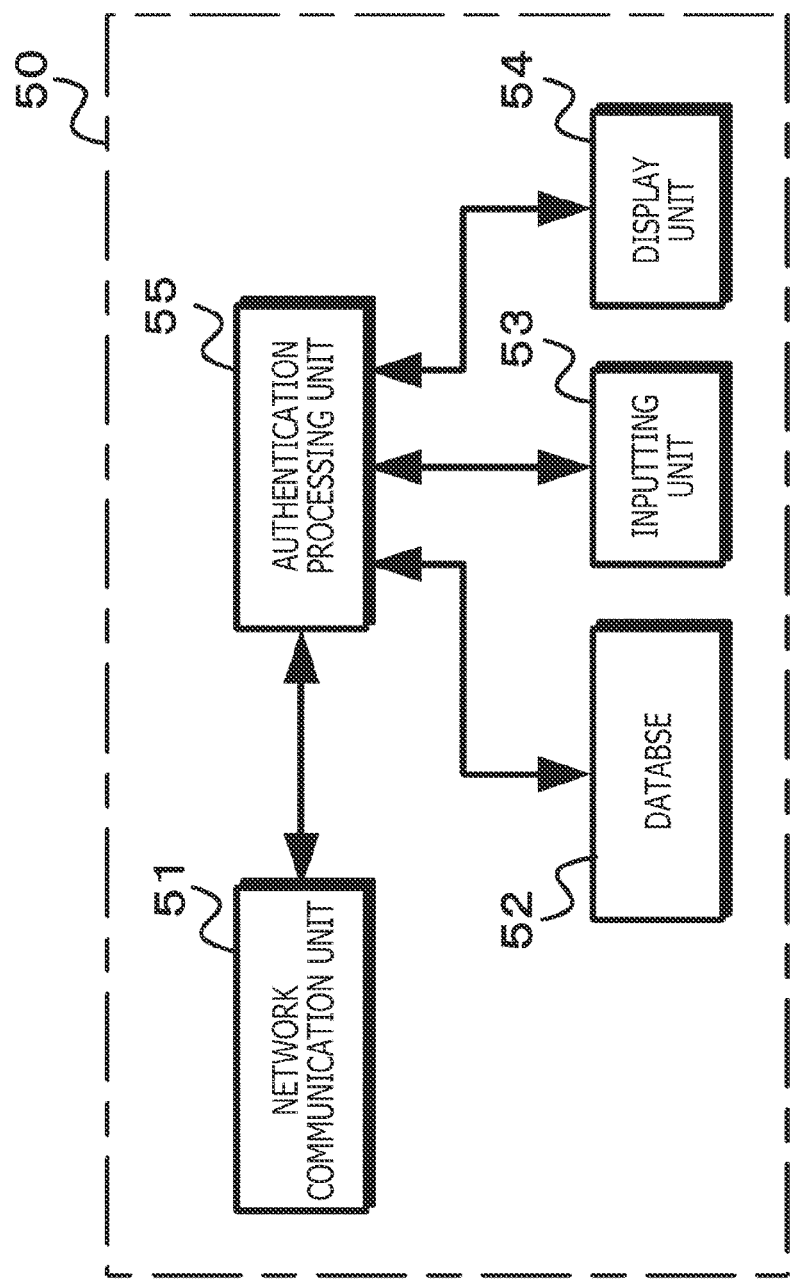
FIG. 5 is a view exemplifying a configuration of an information processing apparatus.

Now, a configuration of the information processing apparatus is described. FIG. 5 exemplifies a configuration of the information processing apparatus. The information processing apparatus 50 includes a network communication unit 51, a database 52, an inputting unit 53, a display unit 54, and an authentication processing unit 55.

The network communication unit 51 is provided in order to perform communication with the portable terminal 30 or the information terminal 40. The network communication unit 51 receives a request, for example, from the portable terminal 30 and outputs the request to the authentication processing unit 55, to transmit, to the portable terminal 30, information generated by processing performed by the authentication processing unit 55 according to the request. Further, the network communication unit 51 receives a request from the information terminal 40 and outputs the request to the authentication processing unit 55, to transmit, to the portable terminal 30, information generated by processing executed by the authentication processing unit 55 according to the request.

The database 52 has stored therein various kinds of information regarding users of contactless IC cards, information of individual information terminals, and so forth.

The inputting unit 53 is configured using a keyboard, a touch panel, a pointing device, and so forth and outputs an operation signal according to a user operation to the authentication processing unit 55. For example, on the inputting unit 53, operations for setting the operation of an information processing unit, a checking operation of an operation situation, checking or update of information stored in the database 52, and so forth are performed.

The display unit 54 is configured using a liquid crystal display element, an organic EL (Electro Luminescence) display element, or the like. The display unit 54 performs display of an operation state or a setting state of the information processing apparatus 50 or information stored in the database 52, update screen image display, and so forth.

The authentication processing unit 55 controls the associated components on the basis of an operation signal from the inputting unit 53, to perform information processing according to a user operation. For example, the authentication processing unit 55 performs processing using information stored in the database 52, according to a request received by the network communication unit 51, to generate an answer according to the request, and outputs the answer to the network communication unit 51. Further, the authentication processing unit 55 performs update of information stored in the database 52, registration of information into the database 52, and so forth on the basis of the information received by the network communication unit 51. Further, the authentication processing unit 55 performs processes of outputting an authentication information request to the portable terminal 30, according to an authentication process request for the information storage medium 20 from the portable terminal 30 using terminal information indicative of the information terminal 40, performing authentication of the information recording medium on the basis of an authentication information answer supplied from the portable terminal 30, outputting approval information that is to be used when a result of authentication of the information storage medium 20 is to be acquired from the information processing apparatus 50 by the information terminal 40, and so forth.

Further, the authentication processing unit 55 generates an encrypted ID code, according to a request for an encrypted IC code from a portable terminal including the approval information and the encrypted ID code attribute information from the portable terminal 30, and outputs the encrypted ID code to the portable terminal. Furthermore, the authentication processing unit performs verification according to an approval information verification request or an encrypted IC code verification request from the information terminal and notifies the information terminal of a verification answer indicative of a result of authentication of the information storage medium.

<6. Operation of Information Processing System>

Now, operation of the information processing system is described. In the information processing system 10, approval information to be used when the information terminal 40 acquires a result of authentication of the information storage medium 20 from the information processing apparatus 50 is generated according to a configuration of the permission information acquisition unit 42 in the information terminal 40. For example, in a case where the permission information acquisition unit 42 is configured using the barcode reader 42a, the information processing apparatus 50 generates approval information by using the approval code method and then generates an approval code. On the other hand, in a case where the permission information acquisition unit 42 is configured using the PIN pad, the information processing apparatus 50 generates approval information by using the encrypted ID code method and then generates an encrypted ID code.

In the following, operation where the approval code method is used is described as first operation of the information processing system, and operation where the encrypted ID code method is used is described as second operation of the information processing system. It is to be noted that, in the following description, a case in which a wireless tag is used as the terminal information presentation unit 70 is exemplified.

<6-1. First Operation of Information Processing System>

Figure 6:
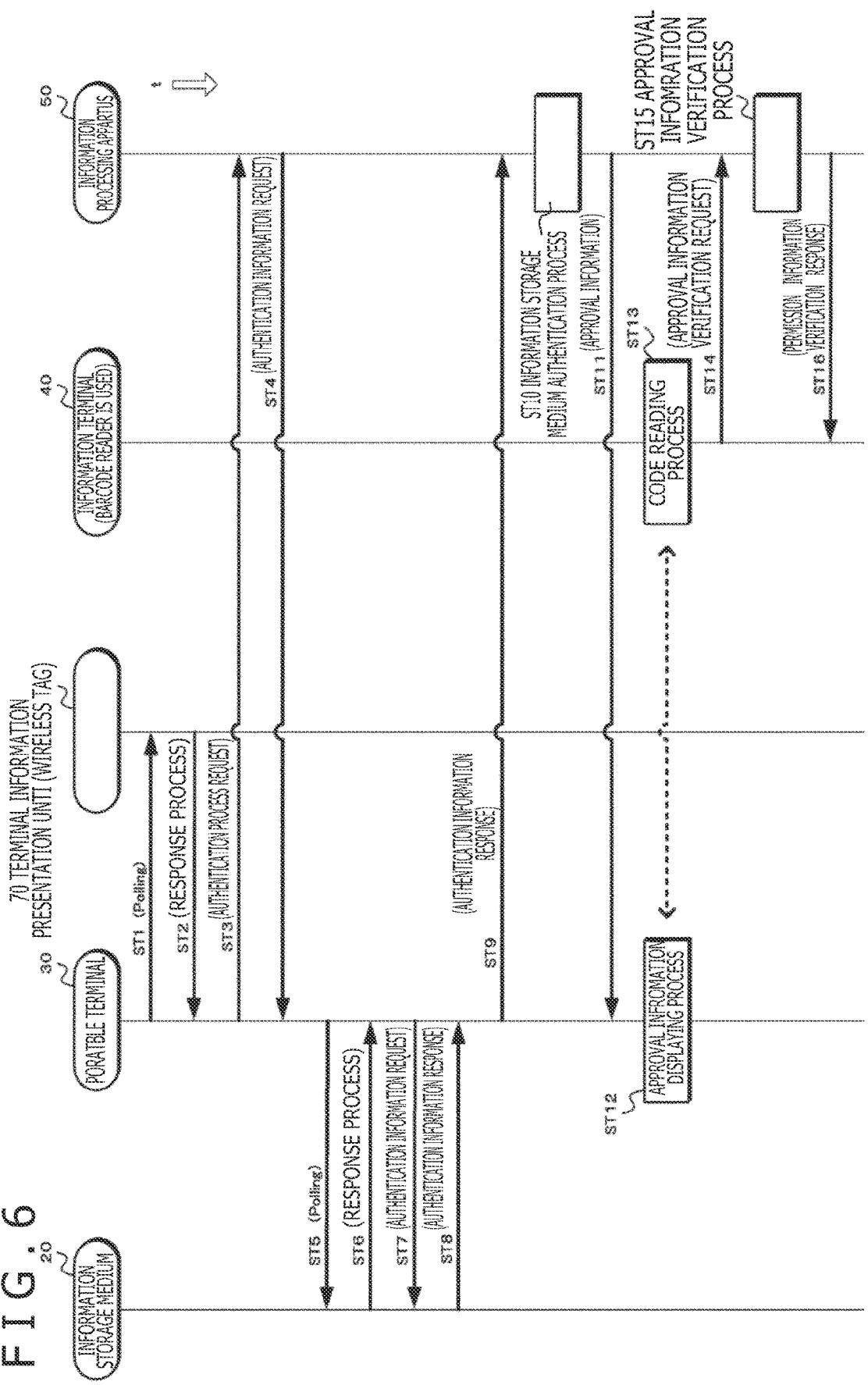
FIG. 6 is a sequence diagram exemplifying first operation of the information processing system.

FIG. 6 is a sequence diagram exemplifying the first operation of the information processing system. In step ST1, the portable terminal 30 performs polling. The portable terminal 30 performs polling in order to detect a terminal information presentation unit (wireless tag) 70 with which it can perform short-range wireless communication.

In step ST2, the terminal information presentation unit 70 performs an answer process in response to the polling from the portable terminal 30. The terminal information presentation unit 70 has stored in advance therein terminal information that is generated by the information processing apparatus 50, and the terminal information presentation unit 70 outputs the terminal information to the portable terminal 30 in response to the polling. The terminal information includes an information terminal identification ID unique to the information terminal set for the information terminal 40.

In step ST3, the portable terminal 30 issues an authentication process request for an information storage medium to the information processing apparatus 50. The portable terminal 30 places the terminal information acquired from the terminal information presentation unit 70 in step ST2 into the authentication process request to make it possible for the information processing apparatus 50 to determine that the authentication process request is an authentication process request for an information storage medium of an authentication target in the information terminal 40 indicated by the terminal information.

In step ST4, the information processing apparatus 50 outputs the authentication information request to the portable terminal 30. The information processing apparatus 50 generates a command of an authentication information request for reading out information necessary for authentication from the information storage medium of the authentication target in the information terminal 40 indicated by the terminal information and outputs the command to the portable terminal 30.

In step ST5, the portable terminal 30 performs polling for detecting an information storage medium 20 with which it can perform short-range wireless communication. Here, the user of the portable terminal 30 adjusts the distance between the information storage medium 20 and the portable terminal 30 so as to enable short-range wireless communication between the information storage medium 20 and the portable terminal 30, thereby allowing the information storage medium 20 to give an answer to the polling.

In step ST6, the information storage medium 20 performs an answer process for the polling from the portable terminal 30 and outputs medium unique information (for example, a card identifier CID) to the portable terminal 30. It is to be noted that the information storage medium 20 which has given an answer to the polling is an information storage medium of the authentication target in the information terminal 40.

In step ST7, the portable terminal 30 outputs the authentication information request supplied from the information processing apparatus 50, to the information storage medium 20 by short-range wireless communication.

In step ST8, the information storage medium 20 generates an authentication information response to the command of the authentication information request and outputs the authentication information response to the portable terminal 30 by short-range wireless communication.

In step ST9, the portable terminal 30 outputs an authentication information answer to the information processing apparatus 50. The portable terminal 30 generates an authentication information answer including the medium unique information acquired in step ST6 and the authentication information response acquired in step ST8 and outputs the authentication information answer to the information processing apparatus 50.

In step ST10, the information processing apparatus 50 performs an information storage medium authentication process. The information processing apparatus 50 verifies the validity of the authentication information response by using, for example, preliminarily-registered key information corresponding to the medium unique information indicated by the authentication information answer. Further, the information processing apparatus 50 generates approval information in response to the validity being verified. Further, the information processing apparatus 50 registers the terminal information indicative of the information terminal 40, the medium unique information indicative of the authenticated information storage medium 20, and the generated approval information, in association with one another into the database.

By performing such processes as described above, the information processing apparatus 50 is able to determine whether the information storage medium of the authentication target in the information terminal 40 is a registered storage medium, through the portable terminal 30.

In step ST11, the information processing apparatus 50 outputs the approval information. The information processing apparatus 50 outputs the approval information generated in step ST10 to the portable terminal 30.

In step ST12, the portable terminal 30 performs an approval information displaying process. The display unit 35 of the portable terminal 30 performs rendering of the approval information acquired from the information processing apparatus 50, to generate a barcode image that can be read by the permission information acquisition unit 42 of the information terminal 40, and displays the barcode image.

Figure 7:
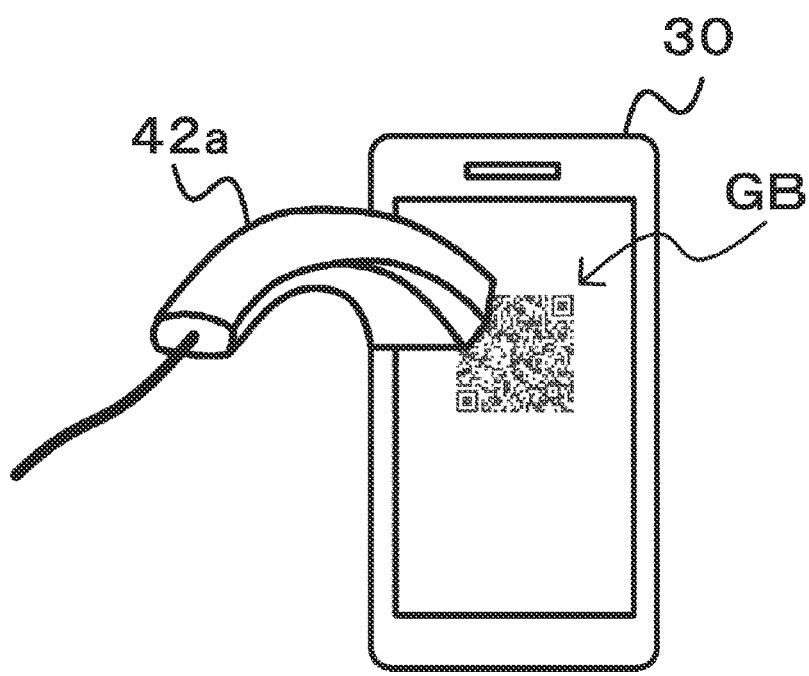
FIG. 7 is a view depicting a code reading process.

In step ST13, the information terminal 40 performs a code reading process. The barcode reader 42a of the permission information acquisition unit 42 of the information terminal 40 scans the barcode image displayed on the portable terminal 30 and acquires the approval information. FIG. 7 depicts the code reading process, and a user of the information terminal 40 acquires the permission information by reading the barcode image GB displayed on the portable terminal 30 with use of the barcode reader 42a.

In step ST14, the information terminal 40 outputs an approval information verification request to the information processing apparatus 50. The information terminal 40 places the terminal information indicative of the information terminal 40 itself and the permission information acquired in step ST13 into the approval information verification request.

In step ST15, the information processing apparatus 50 performs a permission information verification process. The information processing apparatus 50 determines whether the permission information and the terminal information that are indicated by the approval information verification request are registered in association with each other in the database. In a case where the permission information and the terminal information that are indicated by the approval information verification request are registered in association with each other in the database, the information processing apparatus 50 generates a permission information verification answer indicative of information (for example, an ID token) indicating the user of the information storage medium. On the other hand, in a case where the permission information and the terminal information that are indicated by the approval information verification request are not registered in association with each other in the database, the information processing apparatus 50 generates a permission information verification answer indicating that the information storage medium is not permitted.

In step ST16, the information processing apparatus 50 outputs the permission information verification answer. The information processing apparatus 50 outputs the permission information verification answer generated in step ST15 to the information terminal 40.

If such processes as described above are performed, even the information terminal 40 that cannot perform short-range wireless communication with the information storage medium 20 is able to perform authentication of the information storage medium 20 by using the portable terminal 30 that can perform short-range wireless communication with the information storage medium 20 and the information processing apparatus 50.

<6-2. Second Operation of Information Processing System>

Figure 8:
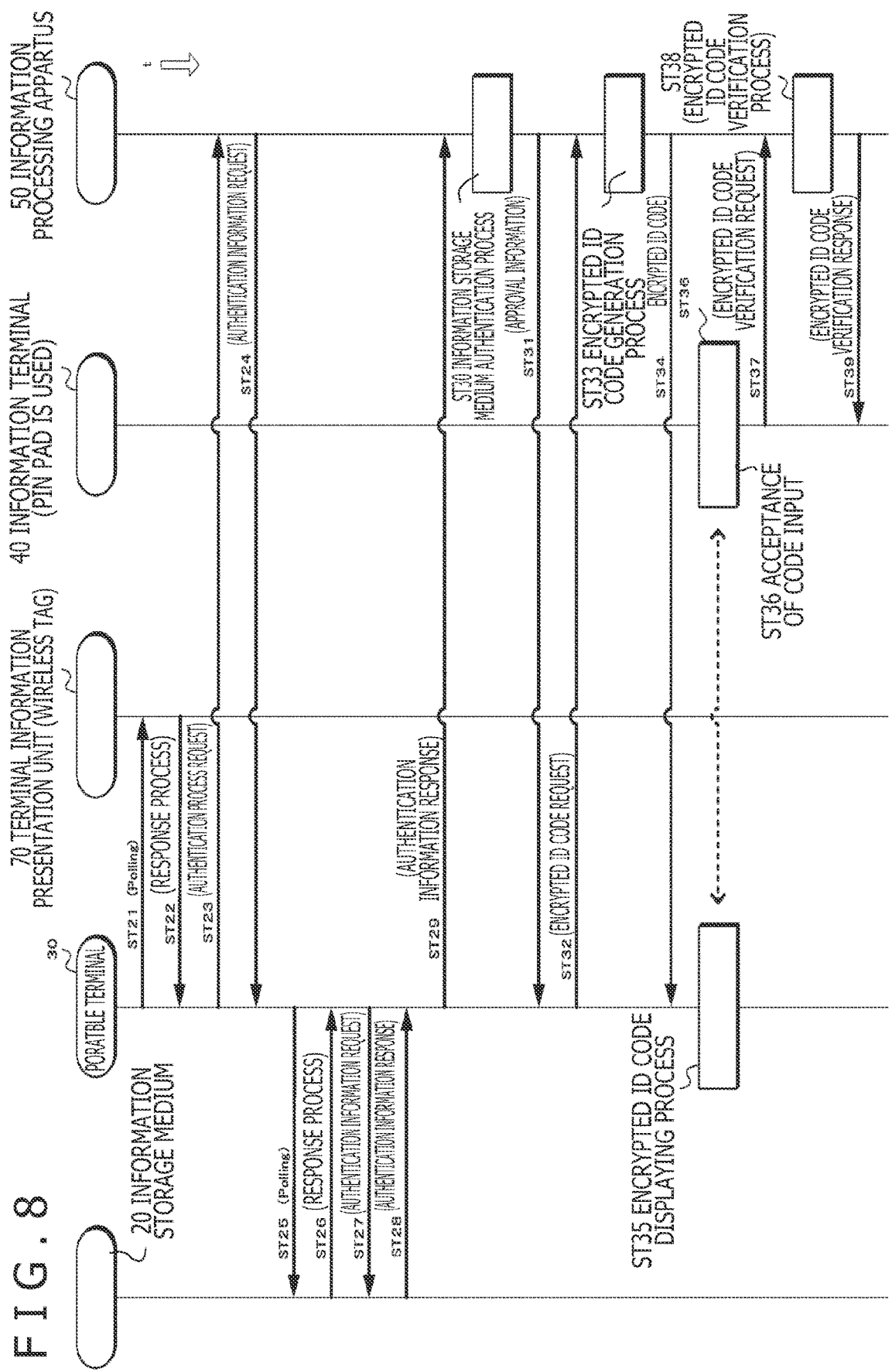
FIG. 8 is a sequence diagram exemplifying second operation of the information processing system.

FIG. 8 is a sequence diagram exemplifying the second operation of the information processing system. In step ST21, the portable terminal 30 performs polling. The portable terminal 30 performs polling for detecting a terminal information presentation unit (wireless tag) 70 with which it can perform short-range wireless communication.

In step ST22, the terminal information presentation unit 70 performs an answer process in response to the polling from the portable terminal 30. The terminal information presentation unit 70 has stored therein in advance terminal information that has been generated by the information processing apparatus 50. The terminal information presentation unit 70 outputs the terminal information to the portable terminal 30 in response to the polling. The terminal information includes the information terminal identification ID unique to the information terminal set for the information terminal 40 and the encrypted ID code attribute information. The encrypted ID code attribute information indicates, for example, an expiration date and a code length of the encrypted ID code.

In step ST23, the portable terminal 30 issues an authentication process request for an information storage medium to the information processing apparatus 50. The portable terminal 30 places the terminal information acquired from the terminal information presentation unit 70 in step ST22 into the authentication process request such that the information processing apparatus 50 can determine that the authentication process request is an authentication process request for the information storage medium of the authentication target in the information terminal 40 indicated by the terminal information. Further, in a case where the terminal information includes encrypted ID code attribute information, the portable terminal 30 determines that the encrypted ID code method is applied and issues an encrypted ID code request as indicated by step ST32 described later.

In step ST24, the information processing apparatus 50 outputs an authentication information request to the portable terminal 30. The information processing apparatus 50 generates a command of an authentication information request for reading out information necessary for authentication from the information recording medium of the authentication target in the information terminal 40 indicated by the terminal information, and outputs the command to the portable terminal 30.

In step S25, the portable terminal 30 performs polling in order to detect an information storage medium 20 with which it can perform short-range wireless communication. Here, the user of the portable terminal 30 adjusts the distance between the information storage medium 20 and the portable terminal 30 so as to enable short-range wireless communication between the information storage medium 20 and the portable terminal 30, thereby allowing the information storage medium 20 to give an answer to the polling.

In step S26, the information storage medium 20 performs an answer process in response to the polling from the portable terminal 30 and outputs medium unique information (for example, a card identifier CID) to the portable terminal 30. It is to be noted that the information storage medium 20 that has given an answer to the polling is the information storage medium of the authentication target in the information terminal 40.

In step ST27, the portable terminal 30 outputs the authentication information request supplied from the information processing apparatus 50, to the information storage medium 20 by short-range wireless communication.

In step ST28, the information storage medium 20 generates an authentication information response to the command of the authentication information request and outputs the authentication information response to the portable terminal 30 by short-range wireless communication.

In step ST29, the portable terminal 30 outputs an authentication information answer to the information processing apparatus 50. The portable terminal 30 generates the authentication information answer including the medium unique information acquired in step ST26 and the authentication information response acquired in step ST28 and outputs it to the information processing apparatus 50.

In step ST30, the information processing apparatus 50 performs an information storage medium authentication process. The information processing apparatus 50 verifies the validity of the authentication information response, for example, using preliminarily-registered key information corresponding to the medium unique information indicated by the authentication information answer. Further, the information processing apparatus 50 generates approval information in response to the validity being verified. Further, the information processing apparatus 50 registers the terminal information indicative of the information terminal 40, medium unique information indicative of the authenticated information storage medium 20, and generated approval information, in association with one another into the database.

By performing such processes as described above, the information processing apparatus 50 is able to determine through the portable terminal 30 whether the information storage medium of the authentication target in the information terminal 40 is a registered information storage medium.

In step S31, the information processing apparatus 50 outputs the approval information. The information processing apparatus 50 outputs the approval information generated in step ST30 to the portable terminal 30.

In the second operation, since the encrypted ID code method is used, the portable terminal 30 issues an encrypted ID code request to the information processing apparatus 50 in step ST32. The portable terminal 30 places the terminal information indicative of the information terminal 40, approval information acquired in step ST31, and encrypted ID code attribute information acquired from the terminal information presentation unit 70 in step ST22 into the encrypted ID code request, to enable the information processing apparatus 50 to generate an encrypted ID code having an expiration date and a code length indicated by the encrypted ID code attribute information and corresponding to the approval information.

In step ST33, the information processing apparatus 50 performs an encrypted ID code generation process. The information processing apparatus 50 generates, according to the encrypted ID code request, an encrypted ID code having an expiration date and a code length indicated by the encrypted ID code attribute information and corresponding to the approval information and outputs the encrypted ID code to the portable terminal 30. Further, the information processing apparatus 50 registers the terminal information indicative of the information terminal 40, approval information, encrypted ID code attribute information, and the generated encrypted ID code, in association with one another into the database.

By performing such processes as described above, the information processing apparatus 50 is able to determine whether an encrypted ID code verification request subsequently supplied from the information terminal 40 is a verification request from a registered information terminal and is a request for verification of an encrypted ID code generated on the basis of permission information.

In step ST34, the information processing apparatus 50 outputs the encrypted ID code. The information processing apparatus 50 outputs the encrypted ID code generated in step ST33 to the portable terminal 30.

In step ST35, the portable terminal 30 performs an encrypted ID code displaying process. The portable terminal 30 displays the encrypted ID code acquired from the information processing apparatus 50 on the display unit 45.

In step S36, the information terminal 40 performs acceptance of a code input. The permission information acquisition unit 42 of the information terminal 40 acquires an encrypted ID code by accepting an inputting operation of the encrypted ID code using the PIN pad. FIG. 9 depicts acceptance of a code input, and the user of the information terminal 40 acquires permission information by inputting the encrypted ID code GC displayed on the portable terminal 30, with use of the PIN pad 42b.

In step ST37, the information terminal 40 outputs an encrypted ID code verification request to the information processing apparatus 50. The information terminal 40 places the terminal information indicative of the information terminal 40 and the encrypted ID code acquired in step ST35 into the encrypted ID code verification request.

In step ST38, the information processing apparatus 50 performs an encrypted ID code verification process. The information processing apparatus 50 determines whether the encrypted ID code and the terminal information that are indicated by the encrypted ID code verification request are registered in association with each other in the database and the expiration date of the encrypted ID code has not passed. In a case where the encrypted ID code and the terminal information that are indicated by the encrypted ID code verification request are registered in association with each other in the database and the expiration date of the encrypted ID code has not passed, the information processing apparatus 50 generates an encrypted ID code verification answer indicative of information (for example, an ID token) indicating the user of the information storage medium. On the other hand, in a case where the encrypted ID code and the terminal information that are indicated by the encrypted ID code verification request are not registered in association with each other in the database, the information processing apparatus 50 generates an encrypted ID code information verification answer indicating that the information storage medium is not permitted. However, in a case where the encrypted ID code and the terminal information that are indicated by the encrypted ID code verification request are registered in association with each other in the database but the expiration date of the encrypted ID code has passed, the information processing apparatus 50 generates an encrypted ID code verification answer indicating that the expiration date has passed.

In step ST39, the information processing apparatus 50 outputs the encrypted ID code verification answer. The information processing apparatus 50 outputs the encrypted ID code verification answer generated in step ST38 to the information terminal 40.

If such processes as described above are performed, even the information terminal 40 that cannot perform short-range wireless communication with the information storage medium 20 is able to perform authentication of the information storage medium 20 by using the portable terminal 30 that can perform short-range wireless communication with the information storage medium 20 and the information processing apparatus 50.

Incidentally, in a case where the expiration date of the encrypted ID code has passed, the information terminal 40 cannot acquire information indicative of the user of the information storage medium. In this case, the information terminal 40 may instruct the user of the portable terminal 30 to perform an operation for acquiring again an encrypted ID code from the information processing apparatus 50.

Figure 10:
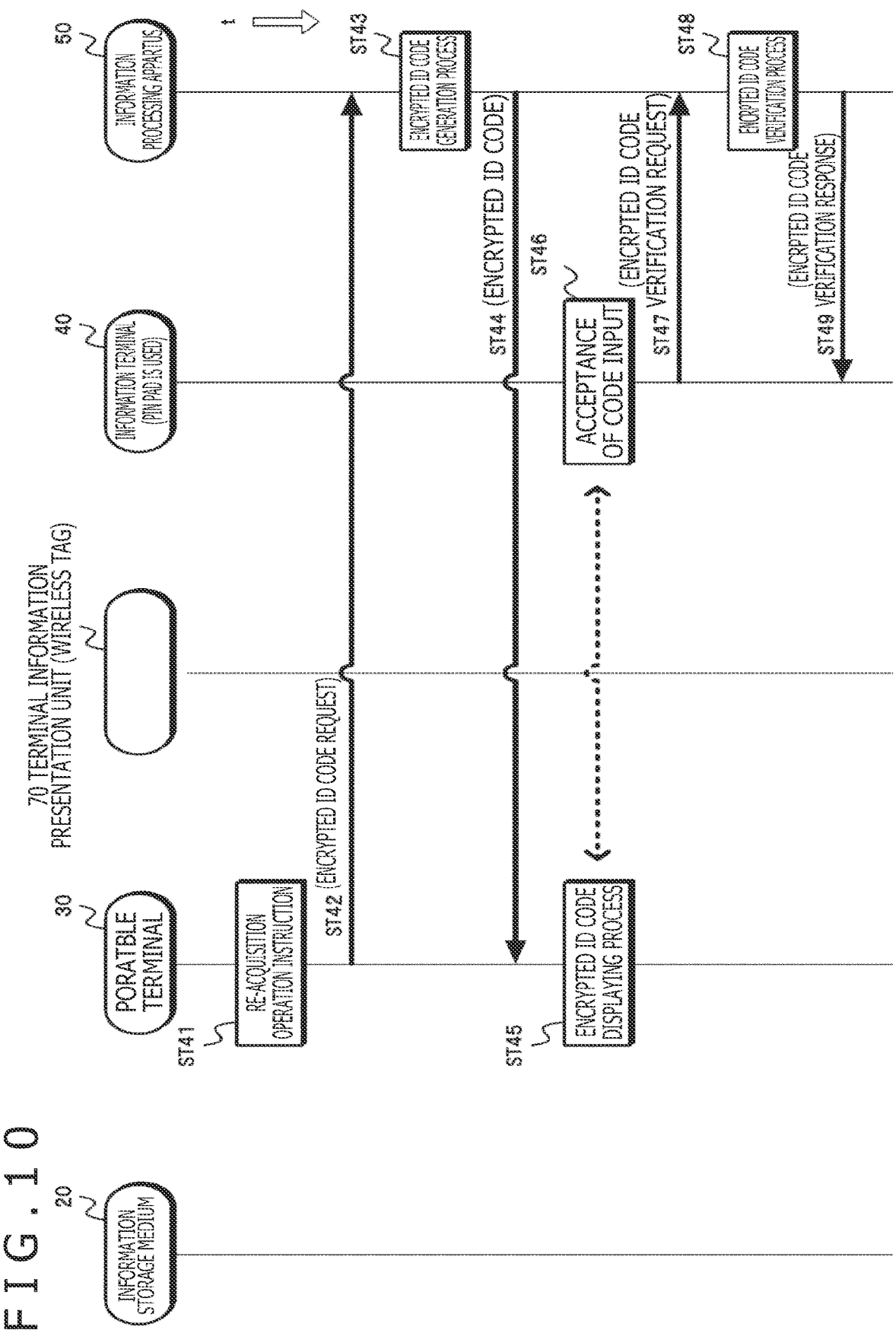
FIG. 10 is a sequence diagram exemplifying operation when an encrypted ID code is acquired again.

FIG. 10 depicts a sequence diagram that exemplifies operation when the encrypted ID code information verification answer indicates that the expiration date has passed and an encrypted ID code is to be acquired again.

In step ST41, the information terminal 40 issues a re-acquisition operation instruction. In a case where the encrypted ID code verification answer outputted from the information processing apparatus 50 indicates that the expiration date has passed, the information terminal 40 performs, for example, display that inputting of a new encrypted ID code is necessary because the expiration date has passed.

In step ST42, the portable terminal 30 issues an encrypted ID code request to the information processing apparatus 50. The portable terminal 30 performs a process similar to that in step ST32 described hereinabove, to issue an encrypted ID code request to the information processing apparatus 50.

In step ST43, the information processing apparatus 50 performs an encrypted ID code generation process. The information processing apparatus 50 generates, in response to the encrypted ID code request, a new encrypted ID code having the expiration date and the code length indicated by the encrypted ID code attribute information and corresponding to the approval information. Further, the information processing apparatus 50 registers the terminal information indicative of the information terminal 40, the approval information, the encrypted ID code attribute information, and the generated new encrypted ID code, in association with one another into the database. It is to be noted that the new encrypted ID code is a code different from the encrypted ID code generated in the preceding step ST33.

By performing such processes as described above, the information processing apparatus 50 is enabled to determine whether an encrypted ID code verification request subsequently supplied from the information terminal 40 is a verification request from a registered information terminal and is a request for verification of a new encrypted ID code generated on the basis of permission information.

In step ST44, the information processing apparatus 50 outputs the encrypted ID code. The information processing apparatus 50 outputs the encrypted ID code generated in step ST43 to the portable terminal 30.

In step ST45, the portable terminal 30 performs an encrypted ID code displaying process. The portable terminal 30 displays the new encrypted ID code acquired from the information processing apparatus 50 on the display unit 45.

In step ST46, the information terminal 40 performs acceptance of a code input. The permission information acquisition unit 42 of the information terminal 40 acquires a new encrypted ID code by accepting an inputting operation of the encrypted ID code using the PIN pad.

In step ST47, the information terminal 40 outputs an encrypted ID code verification request to the information processing apparatus 50. The information terminal 40 places the terminal information indicative of the information terminal 40 and the new encrypted ID code acquired in step ST46 into the encrypted ID code verification request.

In step ST48, the information processing apparatus 50 performs an encrypted ID code verification process. The information processing apparatus 50 determines whether the new encrypted ID code and the terminal information that are indicated by the encrypted ID code verification request are registered in association with each other in the database and the expiration date of the new encrypted ID code has not passed. In a case where the new encrypted ID code and the terminal information that are indicated by the encrypted ID code verification request are registered in association with each other in the database and the expiration date of the new encrypted ID code has not yet passed, the information processing apparatus 50 generates an encrypted ID code verification answer indicative of information (for example, an ID token) indicating the user of the information storage medium.

In step ST49, the information processing apparatus 50 outputs the encrypted ID code verification answer. The information processing apparatus 50 outputs the encrypted ID code verification answer generated in step ST48 to the information terminal 40.

If such processes as described above are performed, then the information processing apparatus 50 is able to provide, to the information terminal 40, information indicative of the user of the information storage medium 20, by using the portable terminal 30 that can perform short-range wireless communication with the information storage medium 20 and the information processing apparatus 50.

<6-3. Other Operation of Information Processing System>

The operation of the information processing system 10 of the present technology is not limited to that described above. For example, in a case where the permission information acquisition unit 42 is configured using the barcode reader 42a and the PIN pad 42b, the information processing apparatus 50 may perform generation of permission information by using any one of the methods.

Further, the terminal information presentation unit 70 may output, to the portable terminal 30, method identification information indicative of with which one of the permission code method and the encrypted ID code method the information terminal 40 is compatible. Further, the terminal information presentation unit 70 may perform provision of terminal information by using not only a wireless tag but also an information presentation image, information presentation sound, or the like. In this case, the portable terminal 30 may capture an information presentation image by the image capturing unit 37 or may take in information presentation sound by the inputting unit 31, to acquire terminal information. For example, an information presentation image may be provided in a shop or information presentation sound may be outputted as guide speech in a shop such that terminal information can be acquired from the information presentation image or the information presentation sound. Further, in a case where the information terminal 40 is provided at an entrance gate or the like of a shop, an event venue, transportation facilities, or the like, the information terminal 40 may be configured such that terminal information can be acquired from a Web page of the shop, event venue, transportation facilities or the like through the network communication unit 33.

Figure 11:
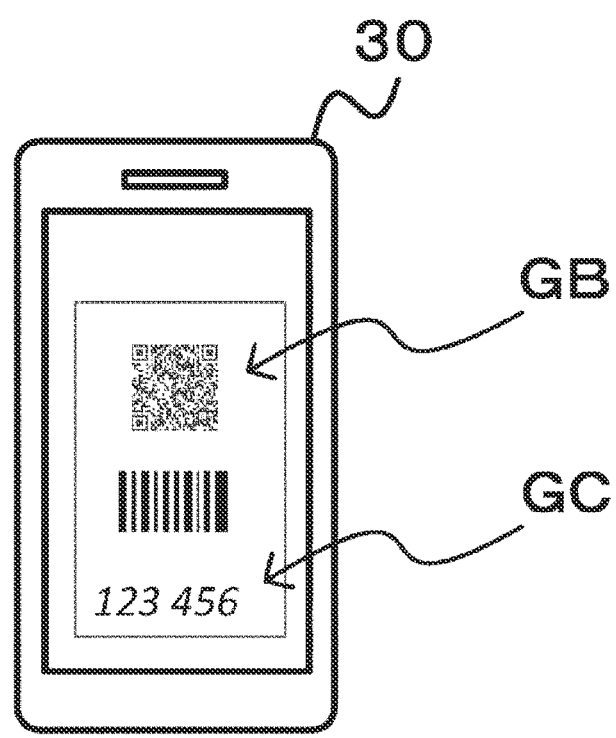
FIG. 11 is a view exemplifying a case in which a barcode image and an encrypted ID code are displayed.

The portable terminal 30 may display, when it has acquired permission information and an encrypted ID code, a barcode image GB and an encrypted ID code GC based on the permission information on the same screen image as depicted in FIG. 11.

It is possible to execute the series of processes described in the specification by hardware, by software, or by a composite configuration of them. In the case where the series of processes is executed by software, a program in which the processing sequence is recorded is installed into a memory in a computer incorporated in hardware for exclusive use and is executed by the computer. Otherwise, the program can be installed into and executed by a computer for universal use that can execute various processes.

For example, it is possible to record in advance the program on or in a hard disk, an SSD (Solid State Drive), or a ROM (Read Only Memory) as a recording medium. Alternatively, it is possible to store (record) the program temporarily or permanently on a removable recording medium such as a flexible disk, a CD-ROM (Compact Disc Read Only Memory), an MO (Magneto optical) disk, a DVD (Digital Versatile Disc), a BD (Blu-Ray Disc (registered trademark)), a magnetic disk, or a semiconductor memory card. Such a removable recording medium as just described can be provided as what is generally called packet software.

Further, the program may not only be installed from a removable recording medium into a computer but may also be transferred from a download site to a computer by wireless or wired transfer through a network such as a LAN (Local Area Network) or the Internet. The computer can receive the programs transferred in such a manner and install the program into a recording medium such as a built-in hard disk.

It is to be noted that the advantageous effects described in the present specification are exemplary to the last and are not restrictive, and additional advantageous effects that are not described herein may be available. Further, the present technology shall not be interpreted by being restricted to the embodiment described hereinabove. The embodiment of the present technology discloses the present technology in the form of illustration, and it is obvious that modification and substitution of the embodiment can be performed by those skilled in the art without departing from the subject matter of the present invention. In other words, in order to determine the subject matter of the present technology, claims should be referred to.

Further, it is also possible for the portable terminal of the present technology to take such configurations as described below.

(1) A portable terminal including:

an information acquisition unit that issues, using terminal information indicative of an information terminal that performs authentication of an information storage medium without performing short-range wireless communication with the information storage medium, an authentication process request for the information storage medium to an information processing apparatus and acquires, from the information processing apparatus, approval information that is to be used when a result of authentication of the information storage medium is to be acquired from the information processing apparatus by the information terminal; and a display unit that performs display based on the approval information acquired by the information acquisition unit.

(2) The portable terminal according to (1), in which the information acquisition unit performs short-range wireless communication with the information storage medium, outputs, to the information storage medium, an authentication information request supplied from the information processing apparatus in response to the authentication process request, and outputs, to the information processing apparatus, an authentication information answer from the information storage medium corresponding to the authentication information request.

(3) The portable terminal according to (1) or (2), in which the terminal information is stored in a wireless tag located in the proximity of the information terminal, and the information acquisition unit acquires the terminal information by performing short-range wireless communication with the wireless tag.

(4) The portable terminal according to (1) or (2), further including:

a position detection unit that detects a current position, in which the terminal information is provided in association with position information of the information terminal, and the information acquisition unit uses terminal information at a position nearest to the current position detected by the position detection unit.

(5) The portable terminal according to (1) or (2), in which
the terminal information is included in application software, and
the information acquisition unit causes the application software to operate and acquires the terminal information.

(6) The portable terminal according to any one of (1) to (5), in which the display unit performs rendering of the approval information and displays a barcode image.

(7) The portable terminal according to any one of (1) to (5), in which
the information acquisition unit acquires an encrypted ID code from the information processing apparatus by using the terminal information and the approval information, and
the display unit displays the acquired encrypted ID code.

(8) The portable terminal according to (7), in which the information acquisition unit acquires, from the information processing apparatus, the encrypted ID code of a code length indicated by encrypted ID code attribute information included in the terminal information.

(9) The portable terminal according to (7) or (8), in which the information acquisition unit further uses expiration date information to acquire an encrypted ID code from the information processing apparatus and acquires again, in a case where an expiration date of the encrypted ID code displayed on the display unit has passed, the encrypted ID code from the information processing apparatus.

(10) The portable terminal according to (9), in which the information acquisition unit uses expiration date information indicated by the encrypted ID code attribute information included in the terminal information.

Meanwhile, it is also possible for the information processing apparatus of the present technology to take such configurations as described below.

(1) An information processing apparatus including:
an authentication processing unit that outputs an authentication information request to a portable terminal in response to an authentication process request for an information storage medium from the portable terminal, the authentication process request being made by using terminal information indicative of an information terminal that performs authentication of the information storage medium without performing short-range wireless communication with the information storage medium, performs authentication of the information storage medium on the basis of an authentication information answer supplied from the portable terminal, and outputs, to the portable terminal, approval information that is to be used when a result of authentication of the information storage medium is to be acquired from the information processing apparatus by the information terminal.

(2) The information processing apparatus according to (1), in which the authentication processing unit outputs the permission information when the authentication processing unit succeeds in verifying that the authentication information answer is an authentication information answer from an information storage medium registered in advance, on the basis of medium unique information of the information storage medium indicated by the authentication information answer.

(3) The information processing apparatus according to (1) or (2), in which the authentication processing unit registers, when the authentication processing unit succeeds in verifying that the authentication information answer is an authentication information answer from the information storage medium registered in advance, the permission information in association with the terminal information and the medium unique information of the information storage medium into a database.

(4) The information processing apparatus according to (3), in which the authentication processing unit generates a permission information verification answer on the basis of a result of comparison between terminal information indicated by an approval information verification request from the information terminal and information that the approval information is registered in the database, and notifies the information terminal of the permission information verification answer.

(5) The information processing apparatus according to (2), in which the authentication processing unit generates an encrypted ID code in response to a request for an encrypted ID code from the portable terminal including the approval information and encrypted ID code attribute information from the portable terminal and outputs the encrypted ID code to the portable terminal, to register the outputted encrypted ID code in association with the terminal information and the permission information into a database.

(6) The authentication processing unit generates an encrypted ID code verification answer on the basis of a result of comparison between terminal information indicated by an encrypted ID code verification request from the information terminal and information that the encrypted ID code is registered in the database, and notifies the information terminal of the encrypted ID code verification response.

REFERENCE SIGNS LIST

10: Information processing system
20: Information storage medium
21: Antenna
22: Power supply unit
23: Communication unit
24, 34, 44: Storage unit
25, 38, 46: Control unit
30: Portable terminal
31, 41, 53: Inputting unit
32: NFC unit
33, 43, 51: Network communication unit
35, 45, 54: Display unit
36: Position detection unit
37: Image capturing unit
40: Information terminal
42: Permission information acquisition unit
50: Information processing apparatus
52: Database
55: Authentication processing unit
60: Network
70: Terminal information presentation unit

The invention claimed is:

1. A portable terminal comprising:
an information acquisition unit that issues, using terminal information indicative of an information terminal that performs authentication of an information storage medium without performing short-range wireless communication with the information storage medium, an authentication process request for the information storage medium to an information processing apparatus and acquires, from the information processing apparatus, approval information that is to be used when a result of authentication of the information storage medium is to be acquired from the information processing apparatus by the information terminal; and a display unit that performs display based on the approval information acquired by the information acquisition unit.

2. The portable terminal according to claim 1, wherein
the information acquisition unit performs short-range wireless communication with the information storage medium, outputs, to the information storage medium, an authentication information request supplied from the information processing apparatus in response to the authentication process request, and outputs, to the information processing apparatus, an authentication information answer from the information storage medium corresponding to the authentication information request.

3. The portable terminal according to claim 1, wherein
the terminal information is stored in a wireless tag located in a proximity of the information terminal, and
the information acquisition unit acquires the terminal information by performing short-range wireless communication with the wireless tag.

4. The portable terminal according to claim 1, further comprising:
a position detection unit that detects a current position, wherein
the terminal information is provided in association with position information of the information terminal, and
the information acquisition unit uses terminal information at a position nearest to the current position detected by the position detection unit.

5. The portable terminal according to claim 1, wherein
the terminal information is included in application software, and
the information acquisition unit causes the application software to operate and acquires the terminal information.

6. The portable terminal according to claim 1, wherein
the display unit performs rendering of the approval information and displays a barcode image.

7. The portable terminal according to claim 1, wherein
the information acquisition unit acquires an encrypted ID code from the information processing apparatus by using the terminal information and the approval information, and
the display unit displays the acquired encrypted ID code.

8. The portable terminal according to claim 7, wherein
the information acquisition unit acquires, from the information processing apparatus, the encrypted ID code of a code length indicated by encrypted ID code attribute information included in the terminal information.

9. The portable terminal according to claim 7, wherein
the information acquisition unit further uses expiration date information to acquire an encrypted ID code from the information processing apparatus and acquires again, in a case where an expiration date of the encrypted ID code displayed on the display unit has passed, the encrypted ID code from the information processing apparatus.

10. The portable terminal according to claim 9, wherein
the information acquisition unit uses expiration date information indicated by the encrypted ID code attribute information included in the terminal information.

11. An information processing method comprising:
causing an information acquisition unit to issue, using terminal information indicative of an information terminal that performs authentication of an information storage medium without performing short-range wireless communication with the information storage medium, an authentication process request for the information storage medium to an information processing apparatus and acquire, from the information processing apparatus, approval information that is to be used when a result of authentication of the information storage medium is to be acquired from the information processing apparatus by the information terminal; and
causing a display unit to perform display based on the approval information acquired by the information acquisition unit.

12. An information processing apparatus comprising:
an authentication processing unit that outputs an authentication information request to a portable terminal in response to an authentication process request for an information storage medium from the portable terminal, the authentication process request being made by using terminal information indicative of an information terminal that performs authentication of the information storage medium without performing short-range wireless communication with the information storage medium, performs authentication of the information storage medium on a basis of an authentication information answer supplied from the portable terminal, and outputs, to the portable terminal, approval information that is to be used when a result of authentication of the information storage medium is to be acquired from the information processing apparatus by the information terminal.

13. The information processing apparatus according to claim 12, wherein
the authentication processing unit outputs the permission information when the authentication processing unit succeeds in verifying that the authentication information answer is an authentication information answer from an information storage medium registered in advance, on a basis of medium unique information of the information storage medium indicated by the authentication information answer.

14. The information processing apparatus according to claim 13, wherein
the authentication processing unit registers, when the authentication processing unit succeeds in verifying that the authentication information answer is an authentication information answer from the information storage medium registered in advance, the permission information in association with the terminal information and the medium unique information of the information storage medium into a database.

15. The information processing apparatus according to claim 14, wherein
the authentication processing unit generates a permission information verification answer on a basis of a result of comparison between terminal information indicated by an approval information authentication request from the information terminal and information that the approval information is registered in the database, and notifies the information terminal of the permission information authentication answer.

16. The information processing apparatus according to claim 12, wherein
the authentication processing unit generates an encrypted ID code in response to a request for an encrypted ID code from the portable terminal including the approval information and encrypted ID code attribute information from the portable terminal and outputs the encrypted ID code to the portable terminal, to register the outputted encrypted ID code in association with the terminal information and the permission information into a database.

17. The information processing apparatus according to claim 16, wherein
the authentication processing unit generates an encrypted ID code authentication answer on a basis of a result of comparison between terminal information indicated by an encrypted ID code verification request from the information terminal and information that the encrypted ID code is registered in the database, and notifies the information terminal of the encrypted ID code authentication answer.

18. An information processing method comprising:
outputting an authentication information request to a portable terminal in response to an authentication process request for an information storage medium from the portable terminal using terminal information indicative of an information terminal that performs authentication of the information storage medium without performing short-range wireless communication with the information storage medium, performing authentication of the information storage medium on a basis of an authentication information answer supplied from the portable terminal, and outputting approval information that is to be used when a result of authentication of the information storage medium is to be acquired from the information processing apparatus by the information terminal, from an authentication processing unit, to the portable terminal.

* * * * *